United States Patent
Tamura

(10) Patent No.: US 9,334,006 B2
(45) Date of Patent: May 10, 2016

(54) STRADDLE-TYPE VEHICLE

(71) Applicant: Kawasaki Jukogyo Kabushiki Kaisha, Kobe-shi, Hyogo (JP)

(72) Inventor: Hiroshi Tamura, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 14/425,307

(22) PCT Filed: Jun. 28, 2013

(86) PCT No.: PCT/JP2013/004032
§ 371 (c)(1),
(2) Date: Mar. 2, 2015

(87) PCT Pub. No.: WO2014/034000
PCT Pub. Date: Mar. 6, 2014

(65) Prior Publication Data
US 2015/0217827 A1    Aug. 6, 2015

(30) Foreign Application Priority Data

Sep. 3, 2012  (JP) ................................. 2012-192807

(51) Int. Cl.
*B62J 35/00* (2006.01)
*B62K 19/30* (2006.01)
(Continued)

(52) U.S. Cl.
CPC *B62J 35/00* (2013.01); *B62J 99/00* (2013.01); *B62K 19/30* (2013.01); *B62J 2099/0046* (2013.01); *B62M 7/04* (2013.01)

(58) Field of Classification Search
CPC .. B62J 35/00; B62J 2099/0046; B62K 19/30; B62M 7/04
See application file for complete search history.

(56) References Cited

U.S. PATENT DOCUMENTS

| 6,889,789 B2 * | 5/2005 | Kurayoshi | B62K 19/30 180/219 |
| 2004/0124024 A1 * | 7/2004 | Kurayoshi | B62K 19/30 180/219 |

(Continued)

FOREIGN PATENT DOCUMENTS

| JP | S57057236 U | 4/1982 |
| JP | S62268789 A | 11/1987 |

(Continued)

OTHER PUBLICATIONS

Japanese Patent Office, International Search Report of PCT/JP2013/004032, Oct. 1, 2013, WIPO, 1 pages.

*Primary Examiner* — Joseph Rocca
*Assistant Examiner* — Gabriela C Craciun
(74) *Attorney, Agent, or Firm* — Alleman Hall McCoy Russell & Tuttle LLP

(57) ABSTRACT

A motorcycle of the present invention comprises a main frame, a fuel tank, and a bracket for fastening a front end portion of the fuel tank to a front portion of the main frame. The bracket includes a bracket body of a flat plate shape, and frame joining portions which partially swell from the bracket body toward the main frame on a reverse surface of the bracket body, wherein the reverse surface is configured to contact the main frame. The frame joining portions are configured to contact the main frame such that a gap through which a throttle cable extends is formed between the bracket body and the main frame. This makes it possible to place the cable such that the cable does not extend around an outer periphery of the bracket provided to fasten the fuel tank to the vehicle body frame.

10 Claims, 10 Drawing Sheets

(51) Int. Cl.
*B62M 7/04* (2006.01)
*B62J 99/00* (2009.01)

(56) References Cited

U.S. PATENT DOCUMENTS

| | | | | |
|---|---|---|---|---|
| 2004/0124031 A1* | 7/2004 | Tanabe | ............... | B62J 1/12 |
| | | | | 180/309 |
| 2008/0169134 A1* | 7/2008 | Tomolillo | ............... | B60J 1/04 |
| | | | | 180/6.24 |
| 2008/0169148 A1* | 7/2008 | Beiber Hoeve | ............... | B62K 11/04 |
| | | | | 180/219 |
| 2008/0169627 A1* | 7/2008 | Bagnariol | ............... | B62J 27/00 |
| | | | | 280/304.3 |
| 2010/0314188 A1* | 12/2010 | Goto | ............... | B62K 19/30 |
| | | | | 180/219 |
| 2013/0068551 A1* | 3/2013 | Su | ............... | B62M 7/04 |
| | | | | 180/230 |

FOREIGN PATENT DOCUMENTS

| | | |
|---|---|---|
| JP | S6344316 Y2 | 11/1988 |
| JP | 07309275 A | 11/1995 |

* cited by examiner

STRADDLE-TYPE VEHICLE

TECHNICAL FIELD

The present invention relates to a straddle-type vehicle in which a fuel tank is mounted onto a main frame.

BACKGROUND ART

There is known a motorcycle having a layout in which a fuel tank is mounted onto a main frame extending rearward from a head pipe of the vehicle body frame, and an engine is mounted below the main frame. In the motorcycle having such a layout, a throttle cable connecting a carburetor attached to the engine to an operation member at the front portion of a vehicle body is placed along the main frame (e.g., Patent Literature 1). Patent Literature 1 discloses a motorcycle in which the throttle cable is placed along the main frame and supported in such a manner that a portion of the throttle cable extends through a groove of a buffer pillow provided between the main frame and the fuel tank.

In the vicinity of a handle of the motorcycle, other cables and the like are placed in addition to the above stated throttle cable. There is proposed a structure devised to properly place these cables collectively (e.g., Patent Literature 2). In a motorcycle disclosed in Patent Literature 2, a component mounting member made of resin is elastically fitted between main frames, and a plurality of components including the above stated cables are supported such that they are fitted to this component mounting member.

CITATION LIST

Patent Literature

Patent Literature 1: Japanese Utility Model Application Publication No. Sho. 57-057236
Patent Literature 2: Japanese Laid-Open Patent Application Publication No. Hei. 07-309275

SUMMARY OF INVENTION

Technical Problem

In an exemplary mounting structure by which a fuel tank is mounted to a vehicle body frame, the vehicle body frame and the fuel tank are joined together via a bracket at the center position in a vehicle width direction (rightward and leftward direction) which is just behind a head pipe of the motorcycle. In this structure, for example, a cable extending downward from the head pipe to a location that is below the fuel tank is placed to extend around the outer periphery of the bracket, because a gap formed between the bracket and the vehicle body frame or a gap formed between the bracket and the fuel tank is narrow.

However, in the structure in which the cable is placed to extend around the outer periphery of the bracket, a portion of the cable extending around the outer periphery of the bracket increases the length of the cable as a whole.

In the motorcycles disclosed in Patent Literature 1 and Patent Literature 2, the cable cannot be laid out unless it is placed to extend around the outer periphery of the bracket.

The present invention has been made in view of the above described problem, and an object of the present invention is to provide a straddle-type vehicle which is capable of placing the cable without extending the cable around the outer periphery of the bracket provided to fasten the fuel tank to the vehicle body frame.

Solution to Problem

According to the present invention, there is provided a straddle-type vehicle comprising: a vehicle body frame; a fuel tank; and a bracket for fastening a front portion of the fuel tank to a front portion of the vehicle body frame; wherein the bracket includes: a bracket body of a flat plate shape; and a swelling portion, which partially swells from the bracket body toward the vehicle body frame, on a reverse surface of the bracket body, which surface is configured to contact the vehicle body frame; and wherein the swelling portion is configured to contact the vehicle body frame such that a gap through which a plurality of cables extend is formed between the bracket body and the vehicle body frame.

In this configuration, since the bracket includes the swelling portion, the gap through which the cables extend may be formed between the bracket body and the vehicle body frame. This makes it possible to extend the cables through the gap formed between the bracket body and the vehicle body frame. Especially, it becomes possible to avoid a situation in which the cables must be placed to extend around the outer periphery of the bracket because of the absence of the gap between the bracket and the vehicle body frame.

Therefore, the straddle-type vehicle of the present invention can achieve an advantage that the cables can be placed such that they do not extend around the outer periphery of the bracket provided to fasten the fuel tank to the vehicle body frame.

In the straddle-type vehicle of the present invention, in the above configuration, the bracket may have a joining portion in the swelling portion, the joining portion being configured to contact the vehicle body frame and to be joined to the vehicle body frame.

In this configuration, since the bracket has the joining portion in the swelling portion, the gap can be formed in the vicinity of the joining portion. Therefore, it becomes possible to avoid a situation in which the cables must be placed to extend around the outer periphery of the bracket, because the vehicle body frame and the bracket body are fitted to each other in the vicinity of the joining portion and thereby an adequate gap for allowing the cables to extend therethrough is not formed between them.

In the straddle-type vehicle of the present invention, in the above configuration, the joining portion may include a first joining portion and a second joining portion which are placed at a front end portion of the bracket body such that the first joining portion and the second joining portion are spaced apart from each other in a rightward and leftward direction; and at least one first cable, of the plurality of cables, may be placed to extend from the front portion of the vehicle body frame toward a rear portion of the vehicle body frame such that the first cable extends through a gap formed by the swelling portion between the first joining portion and the second joining portion on a reverse side of the bracket body.

In this configuration, the first cable is placed to extend through a space between the first joining portion and the second joining portion. In other words, the first cable can be placed such that it enters the front end portion of the bracket body and extends from the front portion of the vehicle body frame toward the rear portion of the vehicle body frame. Therefore, the first cable can be placed in a substantially straight-line shape with a shortest possible length, from the front portion of the vehicle body frame toward the rear portion of the vehicle body frame.

The rightward and leftward direction of the bracket body conforms to the vehicle width direction of the straddle-type vehicle in a state in which the bracket is joined to the straddle-type vehicle. The front end portion of the bracket body refers to the end portion of the bracket body which is located closer to the front portion of the vehicle body frame.

In the straddle-type vehicle of the present invention, in the above configuration, the swelling portion may extend in a forward and rearward direction from the front portion of the vehicle body frame toward a rear portion of the vehicle body frame.

In this configuration, since the swelling portion extends in the forward and rearward direction, the strength of the bracket body in the forward and rearward direction can be increased, and the interference between the swelling portion and the cable extending in the forward and rearward direction can be prevented.

The straddle-type vehicle of the present invention, in the above configuration, may comprise: a clamp for retaining the first cable such that the first cable extends through the gap; wherein the bracket body may be provided with a storage space in which the clamp placed on the reverse side of the bracket body is stored.

In this configuration, the clamp can prevent a displacement of the first cable extending through the bracket body. In addition, since the bracket body is provided with the storage space in which the clamp placed on the reverse side of the bracket body is stored, it becomes possible to prevent a situation in which the interference between the first cable and the vehicle body frame or the bracket body occurs, for example, the first cable retained by the clamp is stuck between the vehicle body frame and the bracket. Also, the clamp can be placed in the vicinity of the gap through which the first cable extends.

In the straddle-type vehicle of the present invention, in the above configuration, the bracket body may have a side wall portion in at least one side portion in the rightward and leftward direction such that an end portion of the side portion protrudes toward the vehicle body frame; and at least one second cable which is different from the first cable may be placed to extend through a passage portion formed by the side wall portion.

In this configuration, the passage portion allows the second cable to be placed in a proper location such that the second cable does not protrude outward from the side portion of the bracket, extending in the forward and rearward direction.

In the straddle-type vehicle of the present invention, in the above configuration, at least the bracket body and the swelling portion may have an integrated structure formed by die casting.

In this configuration, in the straddle-type vehicle of the present invention, since the bracket body and the swelling portion have an integrated structure formed by casting, the bracket body and the swelling portion can be easily formed to have desired shapes, respectively.

Advantageous Effects of Invention

The present invention is configured as described above, and the straddle-type vehicle of the present invention can achieve an advantage that it becomes possible to realize a straddle-type vehicle in which the cable can be placed such that the cable does not extend around the outer periphery of the bracket provided to fasten the fuel tank to the vehicle body frame.

DESCRIPTION OF EMBODIMENTS

Hereinafter, the preferred embodiment of the present invention will be described with reference to the accompanying drawings. Throughout the drawings, the same or corresponding components are designated by the same reference symbols and will not be described in detail repeatedly. The stated directions are referenced from the perspective of a rider riding in a motorcycle.

(Configuration of Motorcycle)

Figure 1:
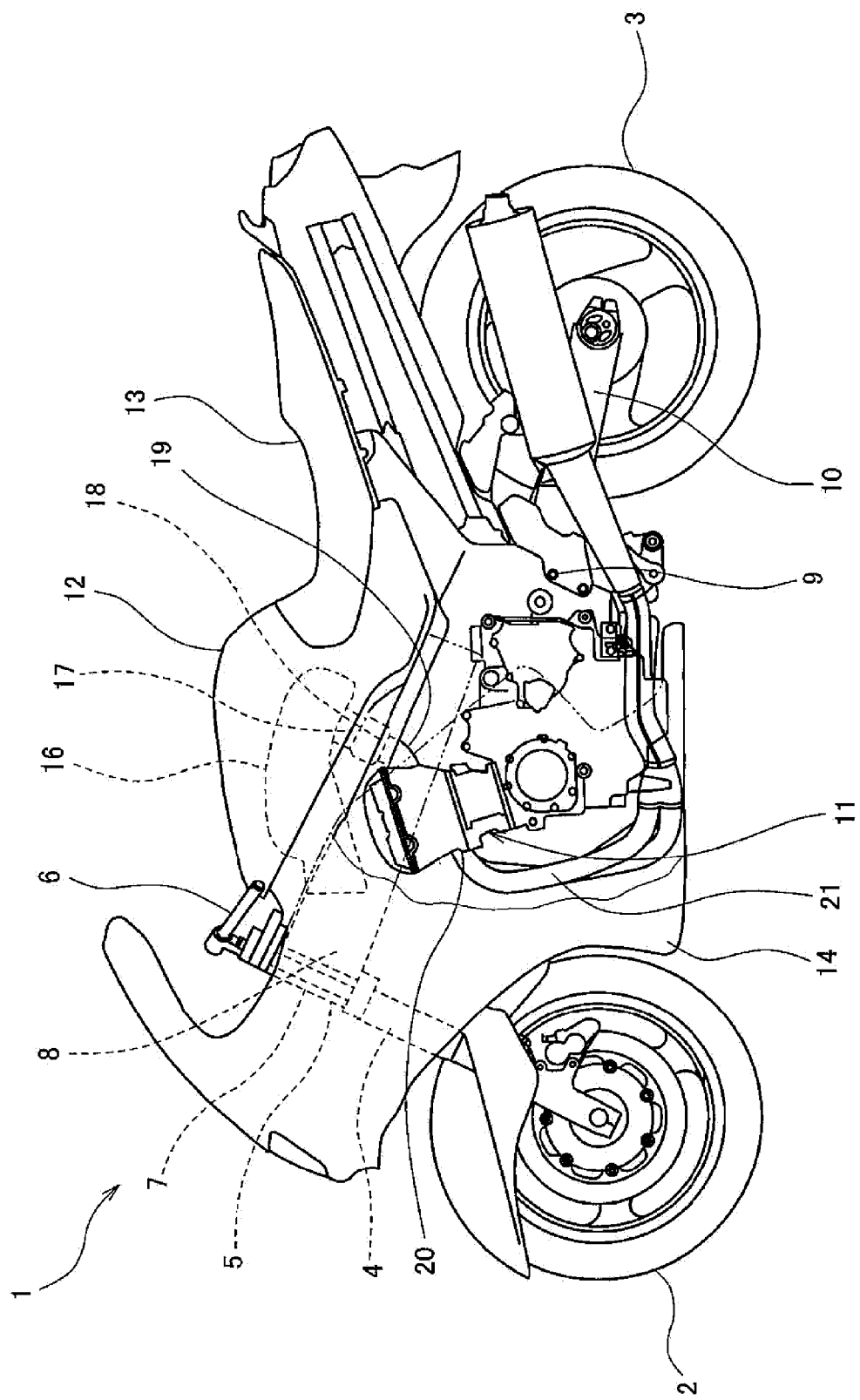
FIG. 1 is a left side view of a motorcycle according to an embodiment of the present invention.

FIG. 1 is a left side view of a motorcycle 1 according to an embodiment of the present invention. As shown in FIG. 1, the motorcycle 1 includes a front wheel 2 and a rear wheel 3. The front wheel 2 is rotatably mounted to the lower portion of a front fork 4 extending vertically. A bar-type steering handle 6 extending in a rightward and leftward direction is attached to the upper portion of the front fork 4 via a steering shaft 5. The steering shaft 5 is rotatably supported by a head pipe 7 constituting a part of a vehicle body frame. A pair of right and left main frames (vehicle body frame) 8 extend rearward from the head pipe 7. Pivot frames 9 extend downward from the rear portions of the main frames 8, respectively. A swing arm 10 is pivotally mounted at its front end portion to the pivot frames 9 such that the swing arm 10 is pivotable around the front end portion. The rear wheel 3 is rotatably mounted on the rear end portion of the swing arm 10.

A fuel tank 12 is provided above the main frames 8. A rider straddle seat 13 is placed behind the fuel tank 12. An engine 11 is mounted below the main frames 8. Hanger brackets 22 (see FIG. 3) extend downward from the pair of main frames 8, respectively. The hanger brackets 22 serve to support the engine 11 from above. The right and left sides of the engine 11 are covered with a cowling 14. The engine 11 is a four-cycle in-line four-cylinder reciprocating engine. In a state in which the engine 11 is mounted in the motorcycle 1, four cylinders are arranged in the rightward and leftward direction and the axis of a crankshaft (not shown) is oriented in the rightward and leftward direction. The driving power of the engine 11 is transmitted to the rear wheel 3 through a chain (not shown).

An exhaust pipe 21 is connected to an exhaust port 20 of the engine 11. The downstream end portion of a throttle device 18 is connected to an intake port 19 of the engine 11. An air cleaner box 16 is connected to the upstream end portion of the throttle device 18 via a flexible air-intake duct 17. The air cleaner box 16 is placed below the fuel tank 12 and above the engine 11.

(Mounting Structure by which Fuel Tank is Mounted to Main Frames)

Figure 2:
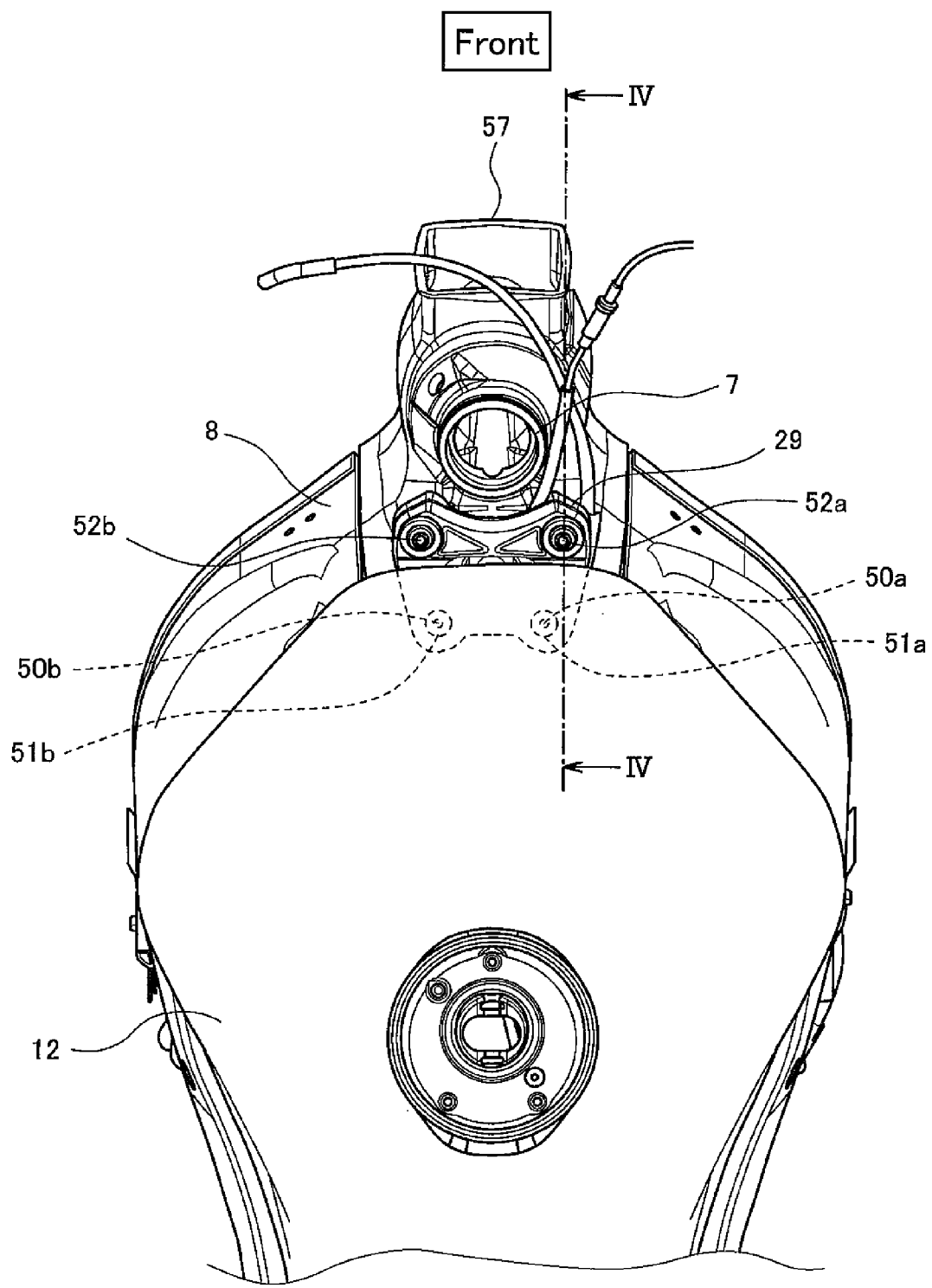
FIG. 2 is a plan view showing a mounting portion by which a fuel tank is mounted to main frames, in the motorcycle according to the embodiment of the present invention.
Figure 3:
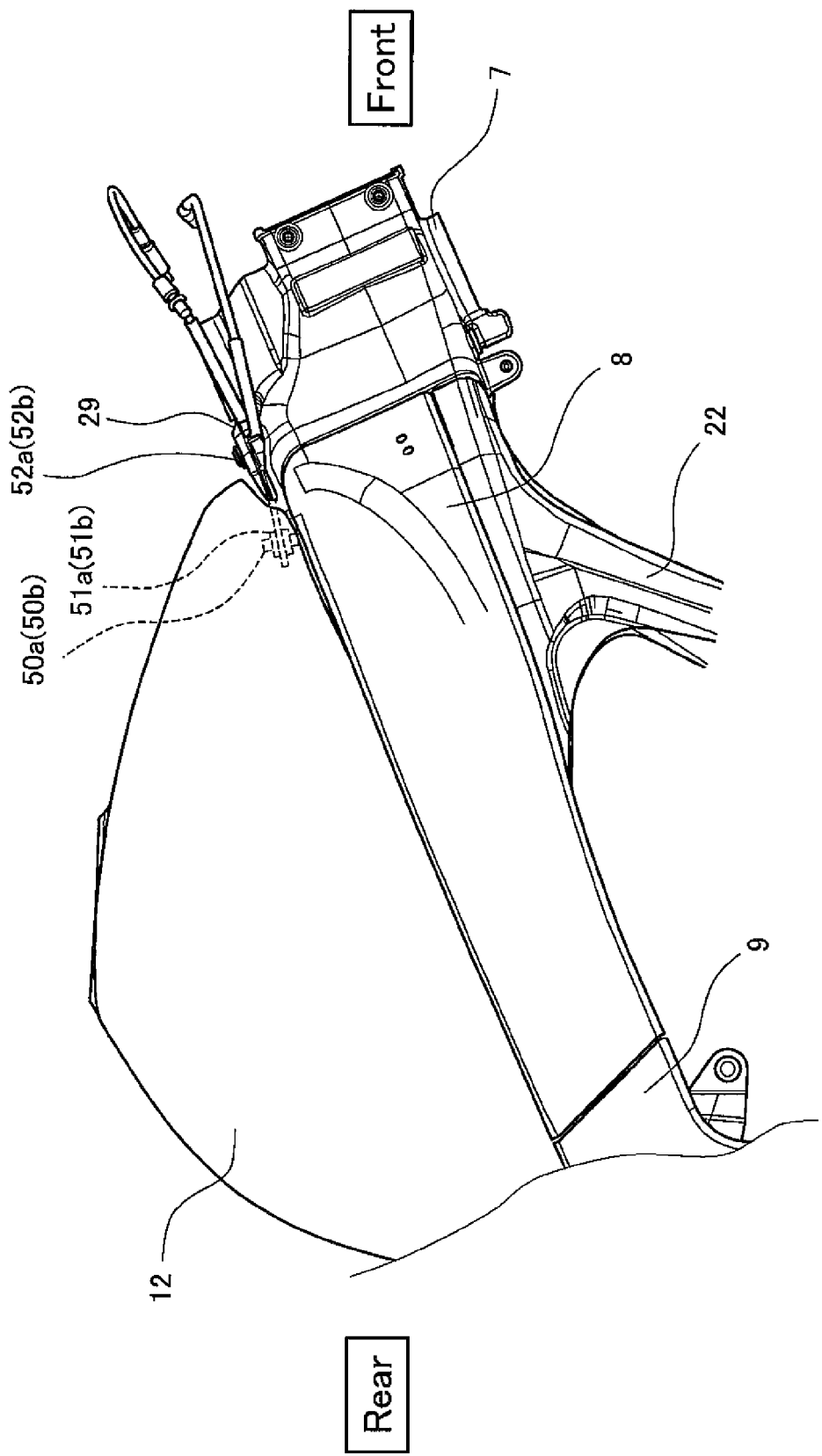
FIG. 3 is a right side view showing the mounting portion by which the fuel tank is mounted to the main frames, in the motorcycle according to the embodiment of the present invention.
Figure 4:
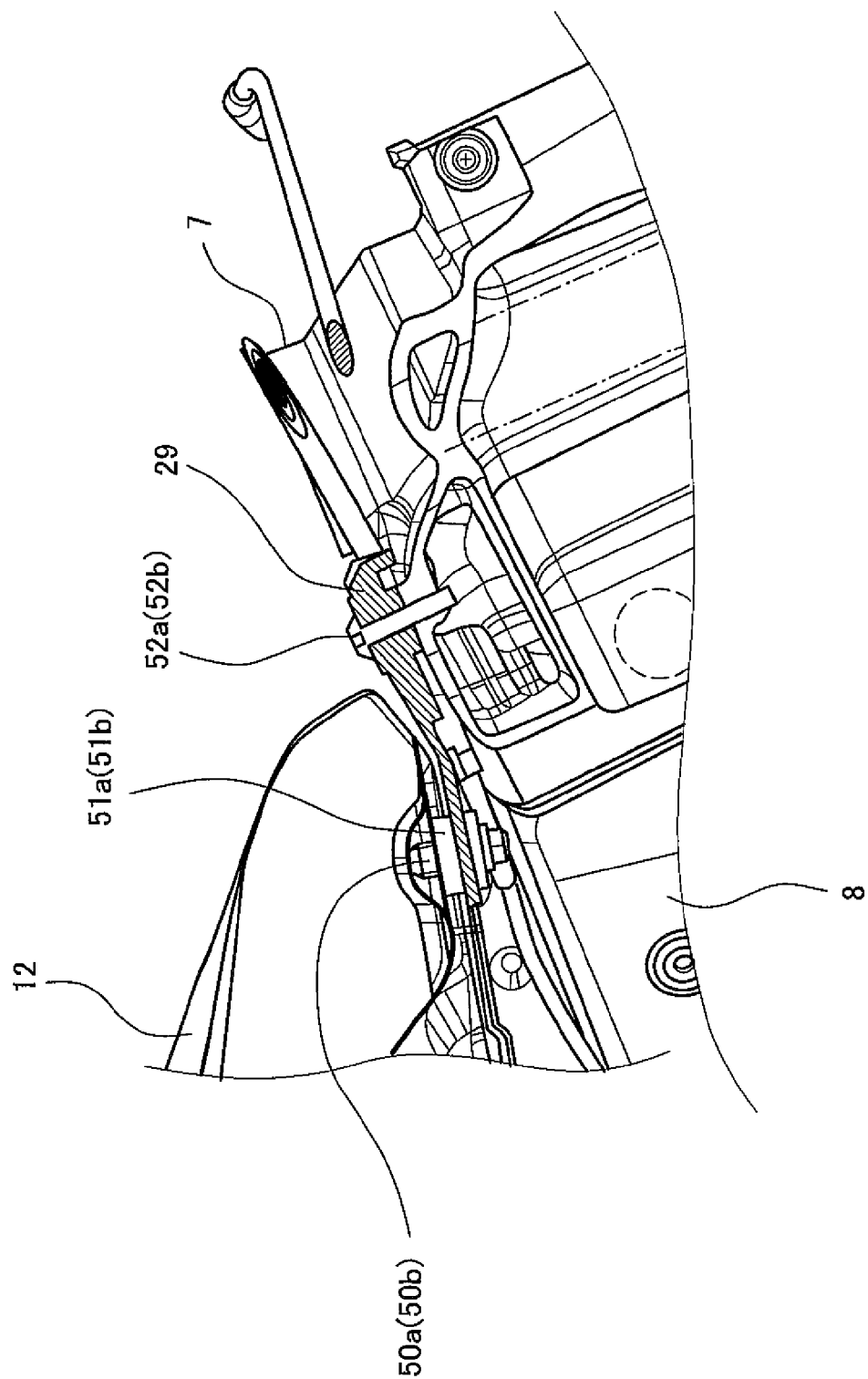
FIG. 4 is a cross-sectional view showing a part taken along line IV-IV of FIG. 2, when viewed from a right side, in the motorcycle of FIG. 2.

The fuel tank 12 is mounted onto the above pair of right and left main frames 8. FIGS. 2 to 4 show the mounting structure by which the fuel tank 12 is mounted to the main frames 8. FIG. 2 is a plan view showing a mounting portion by which the fuel tank 12 is mounted to the main frames 8, in the motorcycle 1 according to the embodiment of the present invention. FIG. 3 is a right side view showing the mounting portion by which the fuel tank 12 is mounted to the main frames 8, in the motorcycle 1 according to the embodiment of the present invention. FIG. 4 is a cross-sectional view showing a part taken along line IV-IV of FIG. 2, when viewed from a right side, in the motorcycle 1 of FIG. 2.

As shown in FIGS. 2 and 3, in the motorcycle 1 of the present embodiment, the fuel tank 12 is joined to the pair of main frames 8 via a bracket 29 at a center position in a vehicle width direction (rightward and leftward direction), which is just behind the head pipe 7.

Specifically, as shown in FIG. 2, the bracket 29 is joined to the upper portions of the main frames 8 by two joining members 52a, 52b such that a reverse side of one end portion of the bracket 29 is in contact with the upper portions of the main frames 8, while as shown in FIGS. 3 and 4, the upper side of the other end portion of the bracket 29 is joined to the lower end of the fuel tank 12 via rubber elements 51a, 51b, by two joining members 50a, 50b. As should be understood, the bracket 29 is cantilever-supported in such a manner that only one end portion of the bracket 29 is joined to the main frames 8.

In the motorcycle 1 according to the present embodiment, the main frames 8 have a hollow structure so that air taken in from outside through an inlet 57 provided in front of the head pipe 7 can be guided to the air cleaner box 16, through inside the main frames 8. To this end, the portions of the main frames 8 which are just behind the head pipe 7 have a sufficient width for allowing the bracket 29 to be mounted to the main frames 8 so that a sufficient amount of air can be taken in.

In the motorcycle 1 according to the present embodiment, the fuel tank 12 may be removed from the main frames 8 by removing the joining members 52a, 52b from the main frames 8, or the bracket 29 may be joined to the main frames 8 by using the joining members 52a, 52b. In other words, the bracket 29 is removably mounted to the fuel tank 12 and to the main frames 8.

(Structure of Bracket)

As described above, the bracket 29 used to join the fuel tank 12 to the main frames 8 has a structure for allowing cables (e.g., a throttle cable 53, a clutch cable 54, etc.) as will be described later to extend through the reverse (lower) side of the bracket 29.

Figure 5:
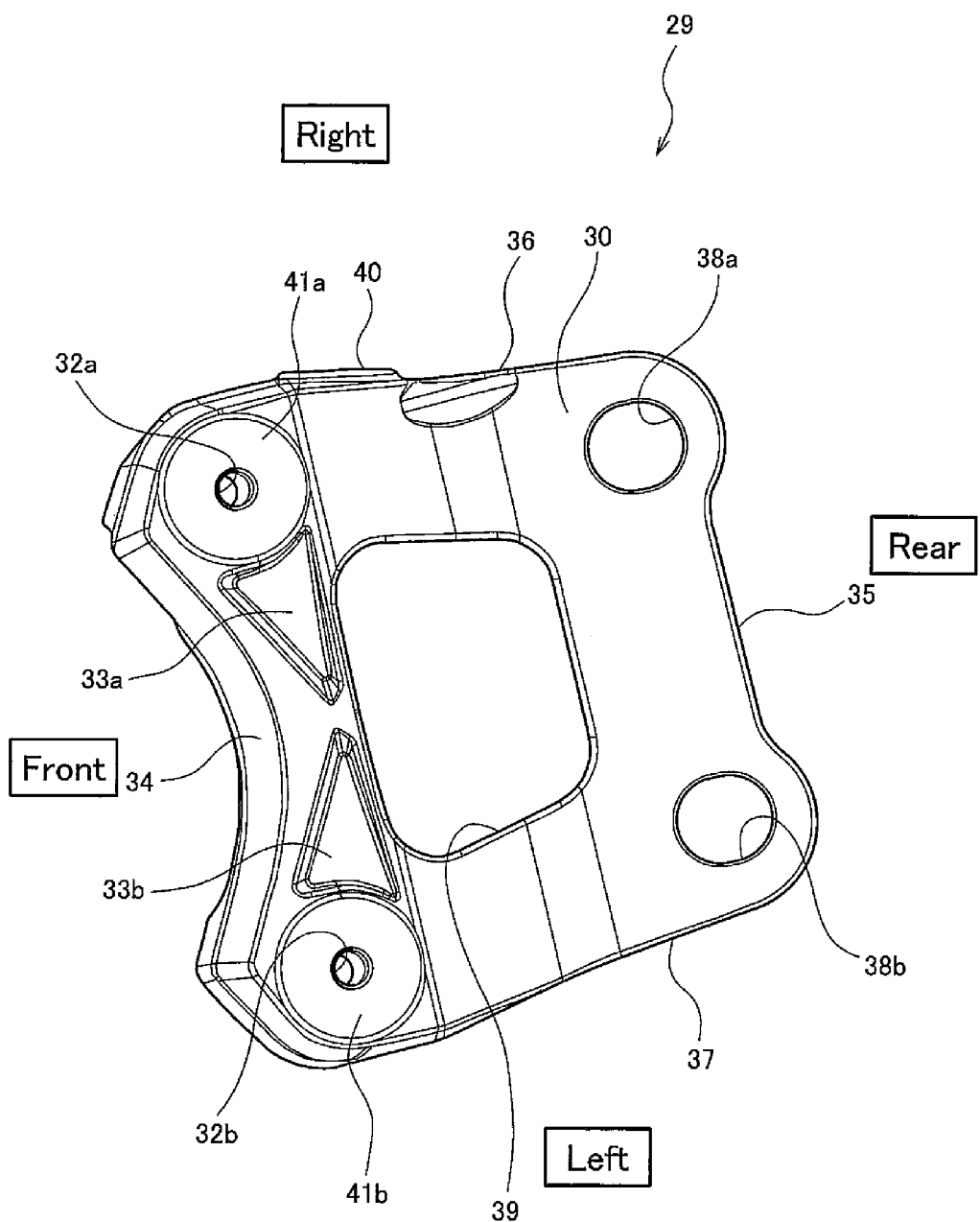
FIG. 5 is a plan view of a bracket in the motorcycle according to the embodiment of the present invention, when viewed from above.
Figure 6:
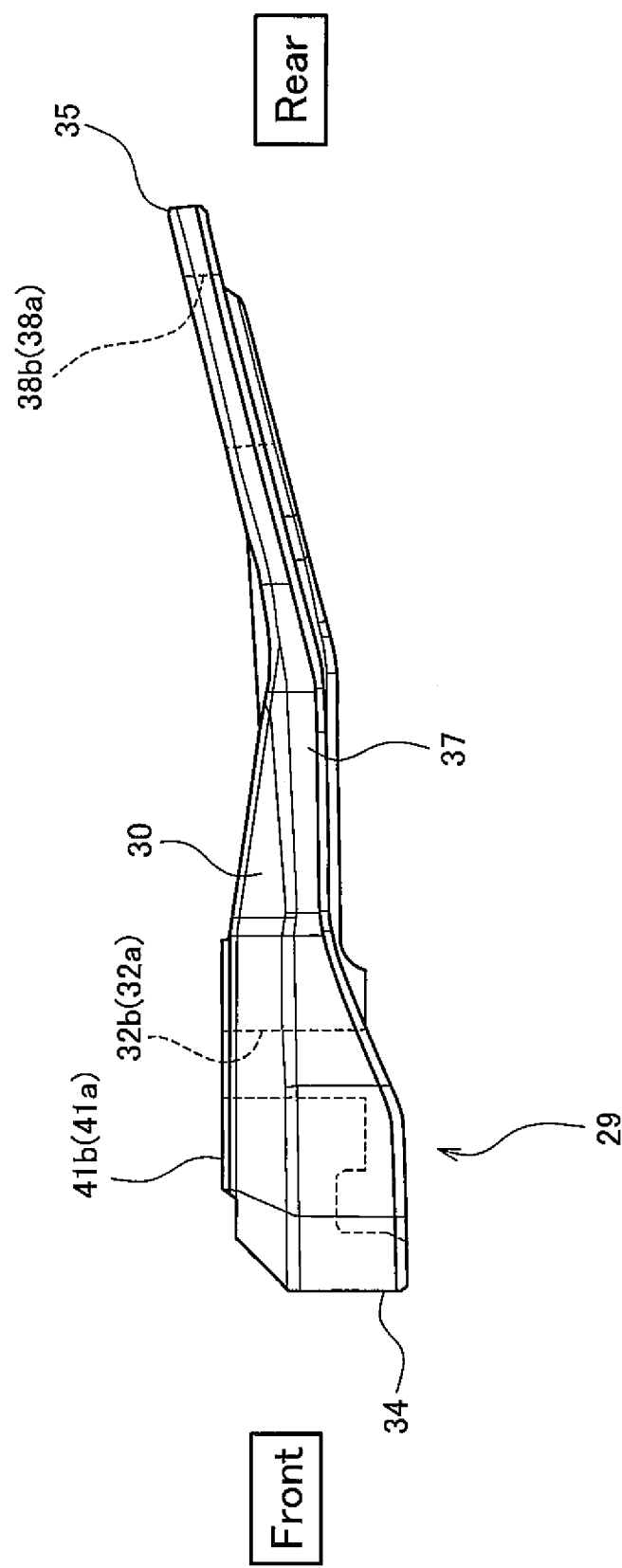
FIG. 6 is a left side view of the bracket of FIG. 5.
Figure 7:
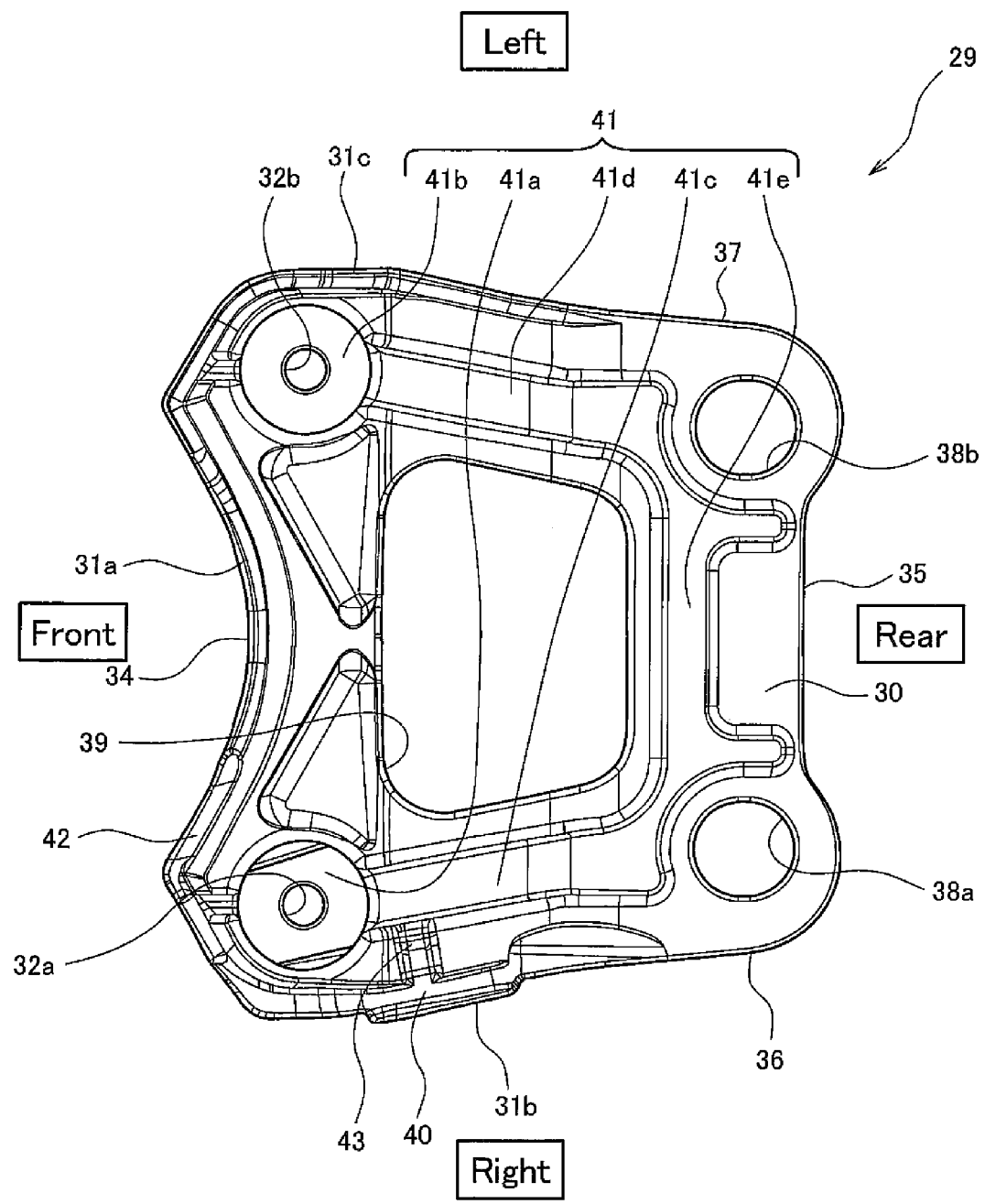
FIG. 7 is a plan view of the bracket of FIG. 5, when viewed from below.

Now, the structure of the bracket 29 will be described in detail, with reference to FIGS. 5 to 8. FIG. 5 is a plan view of the bracket 29 in the motorcycle 1 according to the embodiment of the present invention, when viewed from above. FIG. 6 is a left side view of the bracket 29 of FIG. 5. FIG. 7 is a plan view of the bracket 29 of FIG. 5, when viewed from below.

Figure 8:
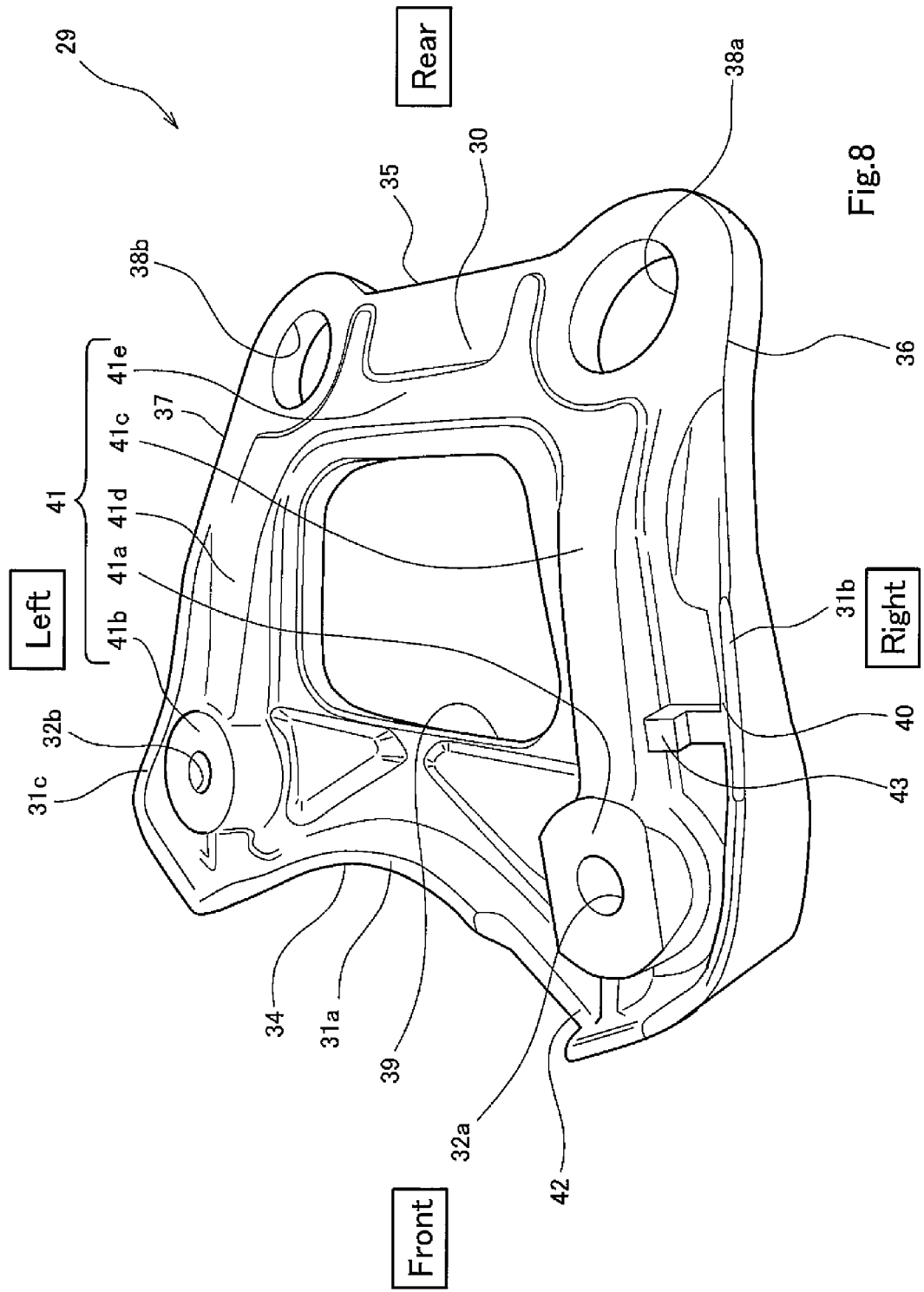
FIG. 8 is a perspective view of the bracket of FIG. 5, when viewed from below.

FIG. 8 is a perspective view of the bracket 29 of FIG. 5, when viewed from below. In the examples of FIGS. 5 to 8, the forward and rearward direction and the rightward and leftward direction are defined in a state in which the bracket 29 is mounted to the motorcycle 1.

The bracket 29 can be manufactured by die casting in such a manner that melted metal such as aluminum is pressed into a die and cast. As shown in FIG. 5, the bracket 29 includes a bracket body 30 of a substantially flat plate shape, tank joining holes 38a, 38b formed on the both ends of a rear end portion 35 of the bracket body 30 in the vehicle width direction (rightward and leftward direction), and an aperture 39 formed at a substantially center region. In addition, as shown in FIGS. 7 and 8, the bracket 29 includes a swelling (raised) portion 41 which swells (is raised) toward the main frames 8, and a side tunnel portion (passage portion) 40 formed at a right side portion 36 of the bracket body 30, on the reverse side of the bracket body 30.

Initially, the structure of the obverse (upper) side of the bracket body 30 will be described.

As shown in FIG. 5, the bracket body 30 is formed by a flat plate of a substantially rectangular shape when viewed from above. More specifically, the front end portion 34 of the bracket body 30 is curved so as to draw a circular-arc shape toward the center portion of the bracket body 30. This is intended to place the bracket 29 in a location which is as forward as possible such that the front end portion 34 does not interfere with a member (e.g., steering shaft 5, etc.) attached to the head pipe 7. The front end portion 34 is curved so as to conform in shape to the outer periphery of the head pipe 7.

As shown in FIGS. 5 to 8, the front end portion 34, the right side portion 36, and the left side portion 37 of the bracket body 30 are provided with a front side wall portion 31a, a right side wall portion 31b and a left side wall portion 31c, respectively, which are formed in such a manner that the end portion of the front end portion 34, the end portion of the right side portion 36, and the end portion of the left side portion 37 are bent so as to protrude toward the main frames 8. The right side wall portion 31b and the left side wall portion 31c are continuous with the front side wall portion 31a. The protruding amount of the right side wall portion 31b and the protruding amount of the left side wall portion 31c are gradually decreased in a rearward direction. The right side wall portion 31b and the left side wall portion 31c terminate at the intermediate portion of the right side portion 36 and the intermediate portion of the left side portion 37, respectively, in the forward and rearward direction. Note that the rear end portion 35 is not provided with such a bent portion. Especially, the front side wall portion 31a which is the bent portion of the front end portion 34, has a hollow space 42 formed by cutting out a portion of the front side wall portion 31a. The hollow space 42 is an insertion opening through which a cable extends through inside the bracket body 30. The hollow space 42 is positioned to allow the cable to extend in a substantially straight-line shape through the inside of the bracket body 30. In the present embodiment, as shown in FIGS. 7 and 8, the hollow space 42 is formed in the front end portion 34 in a location that is closer to the right side portion 36.

The aperture 39 is an opening of a substantially rectangular shape through which the user can see the components below the bracket body 30. As will be described later in detail, a clamp 52 is placed immediately below the aperture 39 to retain the cable (see FIGS. 9 and 10 as will be described later). Through the aperture 39, the user can check a state in which the throttle cable 53 is secured by the clamp 52, or modify the state in which the throttle cable 53 is secured by the clamp 52. The clamp 52 is placed in a region surrounded by the aperture 39, on a surface of the bracket 29 which surface is joined to the main frames 8. Hereinafter, the space which is the region surrounded by the aperture 39 and in which the clamp 52 is placed, will be referred to as a storage space.

The rear end portion 35 has the tank joining holes 38a, 38b at both ends thereof. The tank joining holes 38a, 38b are holes into which the joining members 50a, 50b are inserted, respectively, to join the bracket 29 to the fuel tank 12. Each of the joining members 50a, 50b can be realized by, for example, a combination of a bolt, a washer, and others.

When the bracket 29 is mounted to the fuel tank 12, the rubber elements 51a, 51b are placed between the bracket body 30 and the fuel tank 12, as described above. Then, the joining members 50a, 50b are inserted into the tank joining holes 38a, 38b, respectively in a direction from the reverse side toward the obverse side of the bracket body 30, and the bracket body 30 is joined to the fuel tank 12 such that the rubber elements 51a, 51b are retained between the fuel tank 12 and the bracket body 30. Since the fuel tank 12 and the bracket 29 are joined together such that the rubber elements 51a, 51b are retained between them in this way, the rubber elements 51a, 51b can elastically suppress the fuel tank 12 from being unsteadily joined to the bracket 29 due to vibrations generated by driving the motorcycle 1.

Next, the structure of the reverse (lower) side of the bracket body 30 will be described, with reference to FIGS. 7 and 8.

As shown in FIGS. 7 and 8, the swelling portion 41 includes a pair of frame joining portions 41a, 41b, a pair of longitudinal elongated protruding portions 41c, 41d, and a lateral elongated protruding portion 41e. In addition, as described above, the right side portion 36 of the bracket body 30 has the side tunnel portion (passage portion) 40.

In the present embodiment, the bracket 29 is configured such that the swelling portion 41 is provided on the reverse side of the bracket body 30, and a gap is formed in a state in which a portion of the swelling portion 41 is in contact with the main frames 8. By utilizing the gap formed in this way, the cables can be placed on the reverse side of the bracket 29.

Specifically, the gap with a vertical dimension which is larger than the diameter of the cable to be placed, is formed between the bracket 29 and the main frames 8, and the cable extends through this gap. This makes it possible to place the cable such that the cable does not extend around the outer periphery of the bracket 29.

Initially, the structure of the swelling portion 41 of the reverse (lower) surface of the bracket body 30 will be described. As shown in FIGS. 7 and 8, the swelling portion 41 includes the pair of frame joining portions 41a, 41b formed on the front end portion 34 of the bracket body 30, the longitudinal elongated protruding portions 41c, 41d extending from the frame joining portions 41a, 41b, respectively, toward the rear end portion 35, and the lateral elongated protruding portion 41e extending in the vehicle width (rightward and leftward) direction connecting the longitudinal elongated protruding portions 41c, 41d to each other.

The frame joining portions 41a, 41b serve to join the bracket 29 to the main frames 8. The frame joining portions 41a, 41b have in center portions thereof frame joining holes 32a, 32b into which the joining members 52a, 52b are inserted, respectively.

As shown in FIG. 6, the frame joining portions 41a, 41b have a substantially cylindrical shape in which they protrude by about several millimeters from the obverse surface (upper surface) of the bracket body 30, and protrude by several centimeters (e.g., about 1.5 cm) from the reverse surface (lower surface) of the bracket body 30. As shown in FIGS. 7 and 8, a portion protruding from the reverse surface of the frame joining portion 41a, of the frame joining portions 41a, 41b, has a taper shape which reduces its dimension in a direction in which the frame joining portion 41a protrudes. This allows the cable extending through inside the bracket body 30 or the cable extending through inside the side tunnel portion 40 to be guided to the inside the bracket body 30 or inside the side tunnel portion 40, respectively such that these cables are not substantially bent.

The longitudinal elongated protruding portion 41c is provided to reinforce the bracket body 30 against a bending stress applied thereto in the forward and rearward direction, and is placed in a location that is closer to the right side portion 36 of the bracket body 30. In other words, the longitudinal elongated protruding portion 41c is located inward relative to the edge (right side portion 36) of the bracket body 30. As shown in FIG. 8, the longitudinal elongated protruding portion 41c extends on the reverse surface of the bracket body 30 such that the frame joining portion 41a is its end portion and the extent to which the longitudinal elongated protruding portion 41c protrudes is decreased toward the rear end portion 35 of the bracket body 30. In addition, the longitudinal elongated protruding portion 41c has, in a part of a portion extending from the frame joining portion 41a toward the rear end portion 35, a branch portion extending (swelling branch portion 43 of FIGS. 7 and 8) toward the side tunnel portion 40 in a direction which is substantially perpendicular to the direction in which the portion extends from the frame joining portion 41a toward the rear end portion 35. The cable pulled by a fastening band 55 as will be described later contacts the swelling branch portion 43.

As in the longitudinal elongated protruding portion 41c, the longitudinal elongated protruding portion 41d is provided to reinforce the bracket body 30 against a bending stress applied thereto in the forward and rearward direction, and is placed in a location that is closer to the left side portion 37 of the bracket body 30. In other words, the longitudinal elongated protruding portion 41d is located inward relative to the edge (left side portion 37) of the bracket body 30. As shown in FIG. 8, the longitudinal elongated protruding portion 41d extends on the reverse surface of the bracket body 30 such that the frame joining portion 41b is its end portion and the extent to which the longitudinal elongated protruding portion 41d protrudes is decreased toward the rear side of the bracket body 30.

As described above, the longitudinal elongated protruding portions 41c, 41d are formed to be at highest levels, in the frame joining portions 41a, 41b, respectively. In this structure, the gap can be formed between the frame joining portions 41a, 41b, when the bracket 29 is mounted to the main frames 8. The throttle cable 53 extending from the front side of the motorcycle 1 downward to a location which is below the fuel tank 12 can be inserted into this gap.

The longitudinal elongated protruding portions 41c, 41d are placed on the bracket body 30 in the locations that are closer to the right side portion 36 and the left side portion 37, respectively, and extend from the front side to the rear side. In this structure, the cable can be inserted into the gap formed between frame joining portions 41a, 41b and extend toward the rear end portion 35 through the gap.

The lateral elongated protruding portion 41e is provided to reinforce the bracket body 30 against a bending stress applied thereto in the rightward and leftward direction. The lateral elongated protruding portion 41e extends in the vehicle width (rightward and leftward) direction, and connects the longitudinal elongated protruding portions 41c, 41d to each other, in a location that is closer to the rear end portion 35 than to the front end portion 34, on the reverse surface of the bracket body 30.

As shown in FIG. 6, the thickness of the bracket body 30 is decreased from the front end portion 34 provided with the frame joining portions 41a, 41b toward the rear end portion 35. Thus, the bracket body 30 is configured such that the frame joining portions 41a, 41b are thicker than the remaining portion of the bracket body 30. This makes it possible to enhance the stiffness of the frame joining portions 41a, 41b by which the bracket 29 is joined to the main frames 8.

When viewed from a side, the bracket body 30 has a shape in which the bracket body 30 is bent a little upward in an oblique direction from the substantially center position of the bracket body 30 toward the rear end portion 35 and conforms in shape to the mounting surface of the lower end of the fuel tank 12. In this structure, the gap with a sufficient dimension that allows the throttle cable 53 to extend therethrough is formed between the bracket body 30 and the main frames 8, in a range from the center portion of the bracket body 30 to the rear end portion 35 of the bracket body 30. For this reason, the lateral elongated protruding portion 41e protrudes to an extent that the lateral elongated protruding portion 41e does not interfere with the cable extending through the gap formed between the main frames 8 and the rear end portion 35.

The side tunnel portion 40 is the passage portion which is formed in the right side portion 36 of the bracket body 30 to allow the cable placed along the side portion of the bracket body 30 to extend therethrough. As shown in FIGS. 7 and 8, the right side wall portion 31b (side wall portion) protrudes in such a manner that the end portion of the right side portion 36 is bent and directed downward (toward the main frame 8). The side tunnel portion 40 is defined by the right side wall portion 31b, the reverse surface of the main frame body 30, and the longitudinal protruding portion 41c. The cable (e.g., clutch cable 54) can be placed in the side tunnel portion 40. Thus, in the motorcycle 1, the cable can be guided so that the cable is placed in a proper location and does not protrude outward from the side portion of the bracket body 30.

The bracket 29 is configured such that at least the above swelling portion 41 and the above bracket body 30 have an integrated structure formed by, for example, die casting. Since the bracket 29 is molded by die casting, the swelling portion 41 having a desired shape can be manufactured easily. In addition, recesses 33a, 33b, the side tunnel portion 40, the aperture 39, etc., having desired shapes, can be manufactured easily.

(Layout of Cable)

A plurality of cable types, including cables associated with the activation operation of the motorcycle 1, such as the throttle cable and the clutch cable, and a wire harness used to supply electric power to electric components such as lamps, ECU, meters, and switches, or to communicate signals, are placed in the vicinity of the handle of the motorcycle 1. These cables include the cable extending rearward in the motorcycle 1, from a location that is near the head pipe 7 of the motorcycle 1. For example, one of these cables is connected to a device or the like which is placed above the main frame 8 and in front of the fuel tank 12, and extends rearward from this device.

Figure 9:
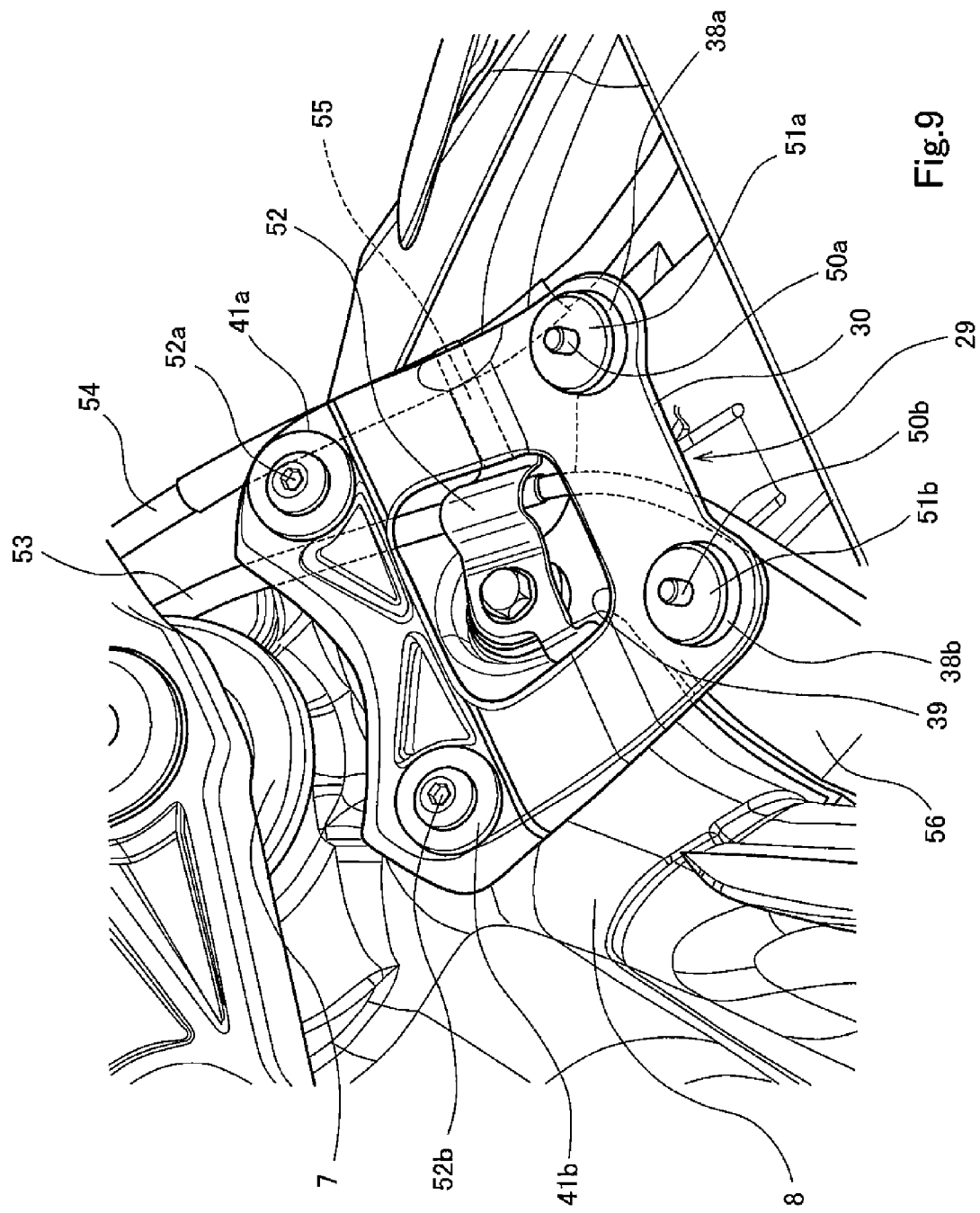
FIG. 9 is a view showing the exemplary cable layout in mounting of the fuel tank to the main frames.
Figure 10:
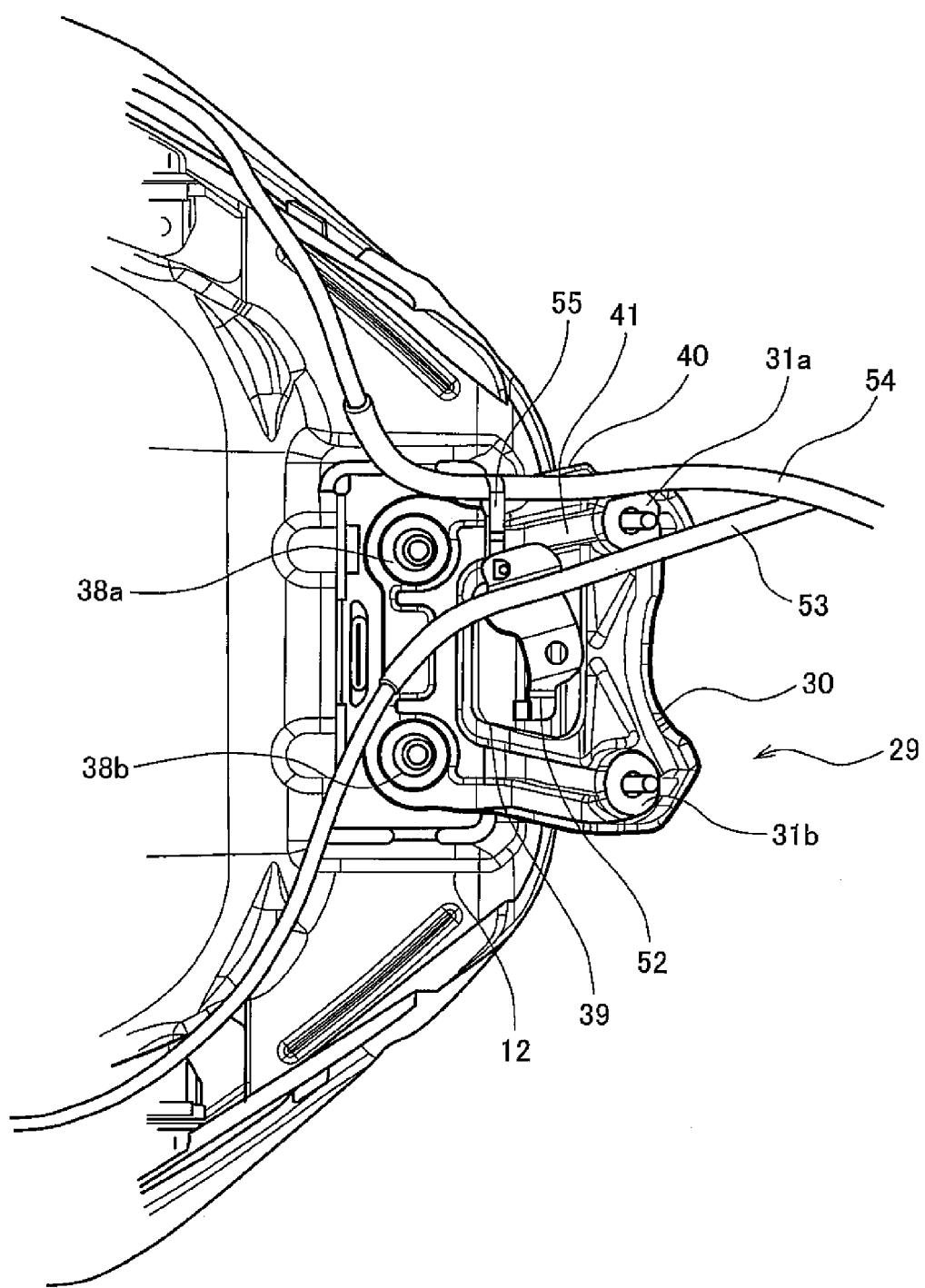
FIG. 10 is a view showing the exemplary cable layout in mounting of the fuel tank to the main frames.

The layout of the throttle cable (first cable) 53 and of the clutch cable (second cable) 54, as the examples of the cables extending rearward in the motorcycle 1, in the bracket 29, will be described with reference to FIGS. 9 and 10. FIGS. 9 and 10 are views showing the exemplary layout of the cables in mounting of the fuel tank 12 to the main frames 8. FIG. 9 shows a state which is seen from the obverse (upper) side of the bracket 29, and in which the fuel tank 12 is detached for easier explanation. FIG. 10 shows a state which is seen from the reverse (lower) side of the bracket 29, and in which the main frames 8 to which the bracket 29 is mounted are omitted, for easier explanation.

As shown in FIGS. 9 and 10, the throttle cable 53 and the clutch cable 54 are placed to extend from a location that is in the vicinity of the head pipe 7 toward the fuel tank 12, through a space between the reverse side of the bracket 29 and the main frames 8. More specifically, the throttle cable 53 is placed to extend into the front end portion 34 of the bracket body 30, through a space between the frame joining portions 41a, 41b, and then through a space between the tank joining holes 38a, 38b.

By comparison, the clutch cable 54 is placed to extend through the side tunnel portion 40 formed in the right side portion 36 of the bracket body 30. That is, the throttle cable 53 is placed to extend through the center portion of the bracket body 30, while the clutch cable 54 is placed to extend along the side portion of the bracket body 30.

The throttle cable 53 placed to extend through the center portion of the bracket body 30, is retained by the clamp 52 immediately below the aperture 39. This allows the throttle cable 53 to be secured in a desired location. Therefore, it becomes possible to prevent a situation in which the throttle cable 53 is curved into an unexpected shape inside the bracket body 30, or is disengaged from the bracket 30 and protrude outside the bracket body 30.

The clamp 52 is fastened onto an air duct 56. As described above, the air inlet 57 is provided in front of the head pipe 7 to take in the air from outside. The head pipe 7 has a double-walled structure. A space formed by the double walls of the head pipe 7 is a passage through which the air taken-in from outside flows. An air outlet (not shown) is provided at the rear side of the head pipe 7 to discharge the air through the passage formed between the walls. The air inlet of the air duct 56 air-tightly communicates with the air outlet. As shown in FIG. 9, a recess is provided on the substantially center portions of the rear ends of the main frames 8, which are just behind the head pipe 7. A tongue-shaped protruding portion extending from the front portion of the air duct 56 is fitted into this recess, and the clamp 52 is fitted to the air duct 56 and to the main frames 8.

Since the throttle cable 53 is secured onto the air duct 56 by the clamp 52, the throttle cable 53 is maintained to be fixed on the air duct 56 in the same position, even in a state in which the bracket 29 is detached from the main frames 8.

As described above, the throttle cable 53 is placed to extend into the front end portion 34 of the bracket body 30, through a space between the frame joining portions 41a, 41b, and then through a space between the tank joining holes 38a, 38b. The swelling portion 41 extends from the frame joining portions 41a, 41b as the end portions thereof, toward the rear end of the bracket body 30, as will be described in detail. In other words, the throttle cable 53 is placed inward relative to the swelling portion 41 in the vehicle width direction such that the throttle cable 53 extends in the forward and rearward direction in the bracket 29. The clamp 52 defines a point through which the throttle cable 53 passes. Therefore, in the motorcycle 1 of the present embodiment, the throttle cable 53 can be placed in a substantially straight-line shape with a shortest possible length, from the front portions of the main frames 8 toward the rear portions of the main frames 8, and this layout can be maintained.

By comparison, the clutch cable 54 placed to extend through the side tunnel portion 40 is fastened by the annular fastening band 55 attached to the clamp 52. More specifically, the fastening band 55 is a fastening member configured such that a band made of a highly elastic synthetic resin band has an annular shape. The clutch cable 54 extends through the inside of the fastening band 55. The fastening band 55 pulls the clutch cable 54 toward the clamp 52 such that the clutch cable 54 is in contact with the swelling portion 41 (swelling branch portion 43) and secured inside the side tunnel portion 40.

As described above, the cables are placed to extend above the main frames 8 and through the reverse side of the bracket 29. Because of this layout, even if the main frames 8 have a large dimension in a vertical direction (height direction), it is not necessary to extend the cables around the outer periphery of the main frames 8, and around the outer periphery of the bracket 29. This can reduce the length of the path over which the cables are placed. As a result, it becomes possible to prevent an increase in the length of the cables.

Modified Examples

In the present embodiment, the configuration of the motorcycle 1 has been exemplarily described. The vehicle in which the fuel tank 12 is mounted to the main frames 8 in the above described manner is not limited to the motorcycle 1. For example, the vehicle may be a straddle-type vehicle including an ATV (all-terrain vehicle), four-wheeled buggy, etc.

Although in the present embodiment, the bracket 29 is configured such that the bracket body 30 and the swelling portion 41 have an integrated structure formed by casting, the present invention is not limited to this structure. For example, the swelling portion 41 may be separable from the bracket 29. Or, the swelling portion 41 may be provided on the main frames 8.

Although in the present embodiment, the bracket 29 is configured such that the side tunnel portion 40 is formed in the right side portion 36 of the bracket body 30, the present invention is not limited to this structure. For example, the side tunnel portion 40 may be formed in the left side portion 37 of the bracket body 30, or in both of the right side portion 36 and the left side portion 37 of the bracket body 30.

Although in the present embodiment, the bracket 29 is configured to have the aperture 39, the present invention is not limited to this structure. For example, the bracket 29 may be configured such that a protruding portion covers the aperture 39 from above, and a storage space for storing the clamp 52 is formed on the reverse side of the bracket body 30 which is covered with this protruding portion.

Although in the present embodiment, the cable extending through a space between the frame joining portions 41a, 41b is the throttle cable 53 and the cable extending through inside the side tunnel portion 40 along the side portion of the bracket body 30 is the clutch cable 54, for easier explanation, the present invention is not limited to this structure. For example, the layout relationship between the throttle cable 53 and the clutch cable 54 may be reversed. Or, the cable extending through a space between the frame joining portions 41a, 41b may be a plurality of cables including another cable in addition to the throttle cable 53. Or, the cable extending through inside the side tunnel portion 40 may be a plurality of cables including another cable in addition to the clutch cable 54. In a case where a plurality of cables are placed to extend through the reverse side of the bracket body 30, the cables may be preferably arranged laterally to a possible extent in a horizontal direction. This layout can prevent an increase in the dimension of the gap in the height direction which is formed between the main frames 8 and the bracket 29, which would be caused if the plurality of cables are arranged in the height direction.

In the present embodiment, the bracket 29 is joined to the main frames 8 by the frame joining portions 41a, 41b in the two locations. Alternatively, only one frame joining portion may be provided and the bracket 29 may be joined to the main frame 8 in one location. In this configuration, a gap is formed between the bracket 29 and the main frame 8 by the swelling portion 41 including the frame joining portion, and the cable may extend through this gap.

Although in the present embodiment, the bracket 29 is configured such that the fastening band 55 is attached to the clamp 52, the clamp 52 and the fastening band 55 may be integrated.

Numerous improvements and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention is effectively applicable to a straddle-type vehicle such as a motorcycle or a buggy, in which the fuel tank 12 is mounted onto the main frames 8.

REFERENCE CHARACTER LIST 1 motorcycle (straddle-type vehicle)
8 main frame (vehicle body frame)
12 fuel tank
29 bracket
30 bracket body
31 right side wall portion (side wall portion)
39 aperture (storage space)
40 side tunnel portion
41 swelling portion
41a frame joining portion (first joining portion)
41b frame joining portion (second joining portion)
52 clamp
53 throttle cable (first cable)
54 clutch cable (second cable)

The invention claimed is:
1. A straddle-type vehicle comprising:
a vehicle body frame;
a fuel tank; and
a bracket for fastening a front end portion of the fuel tank to a front portion of the vehicle body frame;
wherein the bracket includes:
a bracket body of a flat plate shape; and
a swelling portion which partially swells from the bracket body toward the vehicle body frame, on a reverse surface of the bracket body, which surface is configured to contact the vehicle body frame;
wherein the swelling portion extends in a forward and rearward direction from the front portion of the vehicle body frame toward a rear portion of the vehicle body frame; and
wherein the swelling portion is configured to contact the vehicle body frame such that a gap through which a plurality of cables extend is formed between the bracket body and the vehicle body frame.

2. The straddle-type vehicle according to claim 1,
wherein the bracket has a joining portion in the swelling portion, the joining portion being configured to contact the vehicle body frame and to be joined to the vehicle body frame.

3. The straddle-type vehicle according to claim 2,
wherein the joining portion includes a first joining portion and a second joining portion which are placed at a front end portion of the bracket body such that the first joining portion and the second joining portion are spaced apart from each other in a rightward and leftward direction; and
wherein at least one first cable, of the plurality of cables, is placed to extend from the front portion of the vehicle body frame toward a rear portion of the vehicle body frame such that the first cable extends through a gap formed by the swelling portion between the first joining portion and the second joining portion on a reverse side of the bracket body.

4. The straddle-type vehicle according to claim 3, comprising:
a clamp for retaining the first cable such that the first cable extends through the gap;
wherein the bracket body is provided with a storage space in which the clamp placed on the reverse side of the bracket body is stored.

5. The straddle-type vehicle according to claim 3,
wherein the bracket body has a side wall portion in at least one side portion in the rightward and leftward direction such that an end portion of the side portion protrudes toward the vehicle body frame; and
wherein at least one second cable which is different from the first cable is placed to extend through a passage portion formed by the side wall portion.

6. The straddle-type vehicle according to claim 1,
wherein at least the bracket body and the swelling portion have an integrated structure formed by casting.

7. A straddle-type vehicle comprising:
a vehicle body frame;
a fuel tank; and
a bracket for fastening a front end portion of the fuel tank to a front portion of the vehicle body frame;
wherein the bracket includes:
a bracket body of a flat plate shape; and
a swelling portion which partially swells from the bracket body toward the vehicle body frame, on a reverse surface of the bracket body, which surface is configured to contact the vehicle body frame;
wherein the swelling portion is configured to contact the vehicle body frame such that a gap through which a plurality of cables extend is formed between the bracket body and the vehicle body frame;
wherein the bracket has a joining portion in the swelling portion, the joining portion being configured to contact the vehicle body frame and to be joined to the vehicle body frame;
wherein the joining portion includes a first joining portion and a second joining portion which are placed at a front end portion of the bracket body such that the first joining portion and the second joining portion are spaced apart from each other in a rightward and leftward direction; and
wherein at least one first cable, of the plurality of cables, is placed to extend from the front portion of the vehicle body frame toward a rear portion of the vehicle body frame such that the first cable extends through a gap formed by the swelling portion between the first joining portion and the second joining portion on a reverse side of the bracket body.

8. The straddle-type vehicle according to claim 7, comprising:
a clamp for retaining the first cable such that the first cable extends through the gap;
wherein the bracket body is provided with a storage space in which the clamp placed on the reverse side of the bracket body is stored.

9. The straddle-type vehicle according to claim 7,
wherein the bracket body has a side wall portion in at least one side portion in the rightward and leftward direction such that an end portion of the side portion protrudes toward the vehicle body frame; and
wherein at least one second cable which is different from the first cable is placed to extend through a passage portion formed by the side wall portion.

10. The straddle-type vehicle according to claim 7,
wherein at least the bracket body and the swelling portion have an integrated structure formed by casting.

* * * * *